US006801986B2

(12) United States Patent
Steely, Jr. et al.

(10) Patent No.: US 6,801,986 B2
(45) Date of Patent: Oct. 5, 2004

(54) LIVELOCK PREVENTION BY DELAYING SURRENDER OF OWNERSHIP UPON INTERVENING OWNERSHIP REQUEST DURING LOAD LOCKED / STORE CONDITIONAL ATOMIC MEMORY OPERATION

(75) Inventors: Simon C. Steely, Jr., Hudson, NH (US); Stephen R. Van Doren, Northborough, MA (US); Madhumitra Sharma, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 583 days.

(21) Appl. No.: 09/933,536

(22) Filed: Aug. 20, 2001

(65) Prior Publication Data

US 2003/0037223 A1 Feb. 20, 2003

(51) Int. Cl.$^7$ ............................................. G06F 12/00
(52) U.S. Cl. ...................... 711/152; 710/200; 711/141; 711/145; 711/150
(58) Field of Search ......................... 710/200; 711/141, 711/145, 150, 152

(56) References Cited

U.S. PATENT DOCUMENTS 6,460,124 B1 * 10/2002 Kagi et al. ................. 711/163
6,633,960 B1 * 10/2003 Kessler et al. .............. 711/144
2002/0124144 A1 * 9/2002 Gharachorloo et al. ..... 711/145

* cited by examiner

Primary Examiner—Kenneth S. Kim

(57) ABSTRACT

A method, for executing a load locked and a store conditional instruction in a processor, achieves an atomic read-write operation to a memory block. First the load locked instruction is executed to read a memory block, and the processor in response to executing the load locked instruction issues a read modify system command to read the block and to take ownership of the block by the processor, and also sets a lock flag for the address of the memory block, and writes a value of the memory block into a cache of the processor as a cache copy of the memory block. The lock flag, upon receipt of an invalidate message by the processor for the cache copy of the memory block, is reset if any invalidate messages for the memory block are received by the processor. The processor waits for a selected time interval before the processor surrenders ownership of the memory block upon receipt of an ownership request message, if any is received by the processor after execution of the load locked instruction. The processor executes the store conditional instruction, and the processor in response to executing the store conditional instruction tests the lock flag, and if the lock flag is set, writing to the cache copy of the memory block. The processor ends, in the event that the lock flag is reset, the store conditional instruction and does not write to the cache copy of the memory block.

24 Claims, 7 Drawing Sheets

LIVELOCK PREVENTION BY DELAYING SURRENDER OF OWNERSHIP UPON INTERVENING OWNERSHIP REQUEST DURING LOAD LOCKED / STORE CONDITIONAL ATOMIC MEMORY OPERATION

BACKGROUND OF THE INVENTION

1. Field of the Invention

This invention relates to multiprocessor computer systems, and more particularly to the implementation of instructions used to achieve synchronization, mutual exclusion, and atomic read write.

2. Background Information

In a multiprocessor computer system the individual processors must write to the shared memory of the system in a synchronized fashion. That is, if more than one processor is attempting to read and then write to a particular region of shared memory, then each processor must complete its read write before another processor begins to write to that memory location. Synchronization is achieved by the processor obtaining a lock on that memory location. The lock is usually achieved by the processor executing a sequence of special assembly language instructions. Assembly language instructions are executed by a processor, and in response to some instructions the processor issues commands to the system. Commands issued to the system may be classified into three types: Requests, Probes, and Responses.

Requests are commands issued by a processor when, as a result of executing a load or store instruction, it must obtain a copy of data. Requests are also used to gain exclusive ownership to a data item (cache line) from the system. Requests include Read (Rd) commands, Read/Modify (RdMod) commands, Change-to-Dirty (CTD) commands, Victim commands, and Evict commands, the latter of which specify removal of a cache line from a respective cache. A RdMod command is a read of a block of memory, coupled with a request for ownership of the block of memory which was read. That is, the RdMod command reads and modifies the ownership of the block.

A CTD command is issued by a processor and is executed by the system (often the controller coupled to the memory directory) and obtains ownership of a memory block. After the CTD executes, the processor may then change its cache value of the data by writing to its cache. At some point the cache value may be written back to the memory block, depending on writeback policy.

Probes are commands issued by the system to one or more processors requesting data and/or cache tag status updates. Probes include Forwarded Read (Frd) commands, Forwarded Read Modify (FRdMod) commands and Invalidate (Inval) commands. An Inval command is sent to a processor to invalidate a cache line in that processor's cache. When a processor P issues a request to the system, the system may issue one or more probes (via probe packets) to other processors. For example if P requests a copy of a cache line (a Rd request), the system sends a Frd probe to a processor having a dirty copy of the data (if any). If P requests exclusive ownership of a cache line (a CTD request or RdMod request), the system sends Inval probes to one or more processors having copies of the cache line.

Moreover, if P requests both a copy of the cache line as well as exclusive ownership of the cache line (a RdMod request) the system sends a forwarded Read Modify command (Fr_RdMod) in a probe to a processor currently storing a "dirty" copy of the line of data in its cache. In this context, a dirty copy of a cache line represents the most up-to-date version of the corresponding cache line or data block.

In response to the Fr_RdMod probe, the dirty copy of the cache line is returned to the initiating processor where the dirty copy is stored in the corresponding cache. The previous cache is invalidated by the system sending Inval Probes to processors holding the previous cache line in their caches. Upon gaining ownership the processor can then write to the valid copy of the data in its cache.

An Inval Probe may be issued by the system to a processor storing a copy of the cache line in its cache, when the cache line is to be updated by another processor.

Responses are commands from the system to processors and/or the Input Output Ports (IOP). The responses carry the data requested by the processor or an acknowledgment corresponding to a request. For Rd and RdMod requests, the responses are Fill and FillMod responses, respectively, each of which carries the requested data. For a CTD request, the response is a CTD-Success (Ack) or CTD-Failure (Nack) response, indicating success or failure of the CTD, whereas for a Victim request, the response is a Victim-Release response.

In a single processor system, when it is desired to read a memory block, and then to write to that memory block, only one processor reads and writes to that memory block. So the read and the write are simply executed in sequence by the assembly language code.

However, in a multiprocessor system having many processors all of which have access to the target memory block, if processor P1 executes a read, then processor P2 may write to that memory block before processor P1 can write to that memory block. Processor P1 then writes to the memory block, and processor P2 data is corrupted. The processors are not properly synchronized.

Further, each processor has a cache memory. Cache coherency methods must be used in order to establish ownership by a processor of a memory block, and to maintain a cache with the current version of the data in the memory block. The cache with the current version of the data of the memory block is referred to as the "dirty" cache line.

An "atomic read write" is a read and then a write to a memory block by a single processor, where other processors of a multiprocessor system are excluded from writing to that memory block between the read and the write.

An atomic read write may be implemented by a pair of instructions in assembly language code, where the second instruction returns a value from which it can be deduced by the executing assembly language code whether the pair of instructions was executed as if the instructions were atomic. The pair of instructions appears atomic if it appears as if all other operations executed by any processor appear before or after the pair. Thus, when an instruction pair appears atomic, no other processor has changed the value between the instruction pair.

Atomic test-modify-instructions appear in the instruction set of most processors. These are used to implement mutual exclusion and synchronization between processes running on a uni- or multi-processor system. The test-and-modify instructions read a memory location and modify it only if it satisfies some predicate. For instance, a test-and-set instruction typically reads a memory location, tests if the value is "0". If so, it writes a "1" to the same location and "succeeds". If not, it leaves the memory location unchanged and "fails". The instruction is considered atomic since one process must complete its test-and-set sequence before another process is allowed to access the location.

In some modern processors, atomicity is simulated using a pair of instructions such as a LOAD_LOCKED and STORE_CONDITIONAL pair, coupled with a mechanism to detect whether or not the execution proceeded atomically. The mechanism is referred to as the "atomicity-violation-detection mechanism". To perform an atomic test-and-modify operation on a memory location, a LOAD_LOCKED (LD_L) instruction and a STORE_CONDITIONAL (ST_C) instruction are executed in sequence and with the same memory location (the "lock location") as argument. One or more instructions may occur between the LD_L and ST_C instructions. The atomicity-violation-detection mechanism is activated when the LD_L instruction is executed. The ST_C instruction performs a write to the lock location only if the preceding LD_L succeeds and the atomicity-violation-detection mechanism indicates that atomicity has not been violated.

The design of the atomicity-violation-detection mechanism may vary from processor to processor. Here we consider a typical design. Consider a process running on a processor, executing a LD_L and ST_C sequence in an attempt to acquire a lock. The atomicity-violation-detection mechanism signals a violation when: (1) another process or processor performs a write to the lock variable or to any other address in the same cache block as the lock variable; OR (2) the processor does a context switch while the atomicity-violation-detection mechanism is active, as a LD_L from a first context could permit a ST_C from a second context to go forward.

The LD_L and ST_C instructions are used in sequence: if the contents of the memory location specified by the load locked are changed before the store conditional to the same address occurs, then the store conditional fails. If the processor does a context switch between the two instructions, then the store conditional also fails. The store conditional is defined to return a value to the executing code indicating whether or not the store was successful. Thus, the load locked returns to the executing code the initial value of the contents of the memory location and, in exemplary implementations the store conditional returns "0" if it succeeds and "1" otherwise.

Additionally, it is desired for a first processor to be able to gain ownership of a memory block in order to exclude other processors from modifying the memory block. The first processor gains exclusive use of the memory block to read it, or complete another task which also requires that it exclude other processors. The first processor may use an atomic read write in order to gain exclusive ownership of the memory block.

Example of Atomic Read Write Including Cache Coherency

When the code attempts to do an atomic read write to a memory block Z to which a plurality of processors have access, the code is attempting to read the block and then write to the block without another processor changing the block in between the read and write operations.

In multiprocessor systems with private caches, and a cache coherence mechanism with invalidate-on-write semantics, a processor must typically acquire "ownership" (that is, an exclusive copy) of a cache block in order to write to any byte(s) in the cache block.

As mentioned above, the traditional method for achieving an atomic read write to a memory block uses both a load locked (LD_L) instruction and a store conditional (ST_C) instruction. These two instructions are assembly language instructions executing in code running on a processor, and they execute in sequence, first the LD_L and later the ST_C. However, other instructions may intervene between the LD_L and the ST_C.

Status at the beginning of the LD_L and ST_C sequence is assumed to be: P1 is executing assembly language code which wants to read memory block Z and then to write a new desired value into memory block Z; P2 has the current "dirty" value of memory block Z in its cache.

First, in response to the LD_L assembly language instruction, the processor P1: initiates its atomicity detection mechanism by writing into a Load Address Register the address of the block to be read and also "setting" a Lock Flag; and the processor attempts to read the memory block Z from its cache, and usually generates a cache miss. In response to the cache miss, processor P1 issues a READ system command for memory block Z.

In response to the READ system command for memory block Z, the system, for example the directory, locates the processor P2 whose cache has the current version of the memory block Z, that is the "dirty copy", if any processors have the dirty copy. In the event that no processors have the dirty copy, the READ Request goes to memory to read the value of block Z.

In the event that the READ Request must go to the dirty cache line, the system sends a Forwarded Read Probe to processor P2 having the dirty copy in its cache. In response to the Forwarded Read Probe, processor P2 delivers the value of the memory block Z. The value in the memory block Z is returned to processor P1 in a Fill message. Also, the system sets indicator bits in the directory indicating that P1 has a copy of the memory block Z. When the Fill message from P2 reaches P1, then P1 updates its cache with the cache line containing the current value of memory block Z. Processor P1 then usually writes the value of memory block Z into a register of P1.

In the event that another processor, for example P27, writes to the memory block Z before the ST_C instruction executes, then the Lock Flag in the Load Address Register of P1 is reset. The Lock Flag in the Load Address Register of P1 is reset as follows: in order to write to memory block Z, the other processor, P27, must first obtain ownership of memory block Z. When ownership is transferred to the other processor, P27, by the directory, then the last ownership processor sends invalidate messages, an Inval Probe, to each processor having a copy of the cache line containing memory block Z. The arrival of the Inval Probe at P1, the processor executing the LD_L instruction, causes P1 to reset its Lock Flag.

Execution of the ST_C is next described. The ST_C first checks the Load Address Register to determine if the Lock Flag is still set. In the event that the Lock Flag is set, the ST_C instruction proceeds. In the event that the Lock Flag is reset, the ST_C fails and returns a failure code to the assembly language code.

Execution in P1 of the ST_C assembly language instruction usually begins with a cache miss. P1 has a cache miss because P1 usually does not have ownership of memory block Z. Processor P1 then issues a system command: an ownership request, that is a CTD (Change to Dirty). The CTD command goes to the system, that is to the directory. The system checks whether or not P1 has a valid copy, that is a most recent copy of memory block Z, which it can do by checking the indicator bits in the directory. In the event that P1 has a most recent copy of memory block Z as shown by the indicator bits in the directory, then the directory changes ownership to P1. Also, the system sends an Inval Probe to P2 in order to invalidate the P2 cache line for memory block Z, and also sends Inval probes to any other processor having a current value of memory block Z in its cache. Also, the successful CTD causes the system to return an ACK Reply to P1 in a Response message indicating that the CTD was successful.

In response to receiving the ACK, P1 checks the Lock Flag in its LAR. If the flag is still set, and if there has not been a context switch in code executing on P1, the ST_C instruction proceeds. Otherwise, if the flag is reset the ST_C fails and returns a failure value to the executing assembly language code. Upon failure, ownership of memory block Z is with P1, but P1 does not write the value of the argument of the ST_C into its cache.

In the event that the Lock Flag is still set, then P1 writes the new value of memory block Z into its cache, which is now the new dirty copy of the data of memory block Z. Also, in response to the CTD ACK, the ST_C returns to assembly language code executing on P1 an indicia of success, usually a "0". The code can then do a branch test on the returned value. The new value of memory block Z will be written back from the cache of P1 to memory block Z in due course, depending upon the write back policy used by the system.

In the contrary event that P1 does not have a most recent copy of memory block Z because some other processor has intervened (intervening processor) since the READ and changed the value in memory block Z, then an Inval probe is received by P1 from the controller connected to the directory executing the intervening processor ownership request. The lock bit is reset by P1 in response to receipt of the Inval probe. The ST_C checks the lock bit and finds it "reset", and therefore fails. The ST_C returns to code executing on P1 an indicia of failure, usually a "1". The code can then do a branch test on the returned value. Usually a branch on failure does a loop to repeat the load locked/store conditional sequence until success is achieved.

Status at the end of a successful LD_L and ST_C sequence is: the P2 cache is invalidated, along with all other caches previously holding valid copies of memory block Z; P1 has the value formerly in the memory block Z (actually the dirty value read from the P2 cache) written into a register; P1 has ownership of memory block Z, and P1 has written its desired new value of memory block Z into its own cache, and this is the new dirty value of memory block Z.

Two system commands were issued to accomplish successful execution of the LD_L and ST_C commands in code running on P1: the cache miss on Read by P1; and, the cache miss on Write by P1.

The problem of inter-processor synchronization in a multiprocessor system is described by John Hennessy and David Patterson in their book *Computer Architecture a Quantitative Approach, Second Edition,* Copyright date 1996, published by Morgan Kaufmann Publishers, Inc., San Francisco, all disclosures of which are incorporated herein by reference, especially at pages 694 through 707.

Also the problem of atomic read/write and inter-processor synchronization in a multiprocessor system is described by David E. Culler and Jaswinder P. Singh in their book *"Parallel Computer Architecture",* published by Morgan Kaufmann Publishers, Inc., San Francisco, all disclosures of which are incorporated herein by reference, especially at pages 391–393.

A difficulty with the load locked/store conditional sequence as described herein above is that a processor may write to the memory block Z after P1 does its Read, and before the CTD issued by P1 arrives at the system directory. For example, if two processors are both trying to do an atomic read/write to memory block Z, then each executes its Read, one does its CTD and then the other fails. The failing processor then repeats its load locked/store conditional sequence by branching into a loop, and will take ownership of memory block Z away from the other processor. Each trade of ownership requires two system commands, and the execution of these system commands contributes to undesirable overhead.

There is needed a method for doing an atomic read/write sequence which reduces the number of system commands and so reduces system overhead during contention for a memory block by two or more processors in a multiprocessor computer system.

SUMMARY OF THE INVENTION

There are two significant parts to the invention. First, all LD_L instructions that miss in the processor P1 cache generate ownership read requests, that is RdMod requests. Formerly Read requests were generated by the cache miss from a LD_L instruction. Second, a set of constraints is imposed on "memory request messages" to eliminate any livelock problem arising from the RdMod Request.

When a processor P2 having the dirty copy of a memory block X in its cache receives a memory ownership request message (usually a forwarded RdMod Probe from another processor) from the cache-coherence mechanism, from some other processor P1 issuing an ownership request to cache block X, processor P2 will supply the requested data and relinquish ownership if there is no Miss Address File (MAF) entry for this address. However, if an outstanding MAF entry exists for this address at processor P2, then processor P2 relinquishes ownership of memory block X only if and when at least one of the three conditions below are true:

1) P2 has executed more than some pre-determined number of instructions since it executed a LD_L instruction, and logically ANDed with the requirement that P2 Miss Address File (MAF) be fully retired to insure that no cache miss Requests are pending;

2) Some pre-determined number of cycles have expired since P2 executed it's most recent LD_L instruction;

3) A ST_C instruction has been successfully retired since P2 executed it's most recent LD_L instruction.

Rule 3 requires that the processor wait until the ST_C instruction completes.

Rule 1 and Rule 2 have the processor wait a reasonable time period for the ST_C instruction to execute. However, in the event that for some reason the ST_C instruction never executes, then either Rule 1 or Rule 2 will fire, and the process executing in the processor will go forward. A ST_C instruction may never execute for a number of reasons, for example: the program takes a branch which has no ST_C instruction written; a programming error; . . . etc.

Other and further aspects of the present invention will become apparent during the course of the following description and by reference to the accompanying drawings.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
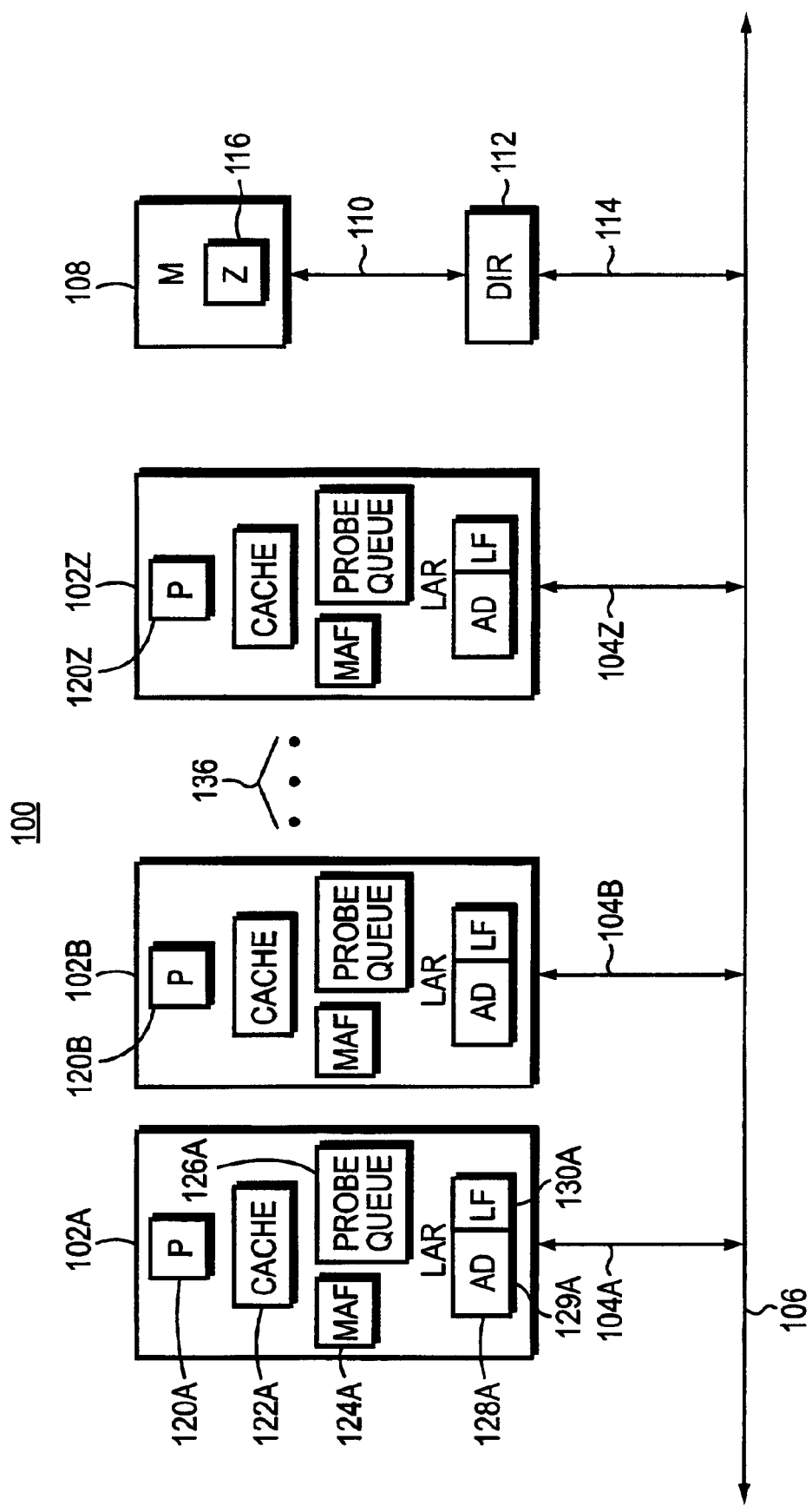
FIG. 1 is a block diagram of a multiprocessor computer system.

Turning now to FIG. 1, multiprocessor computer system 100 is shown. Processor system 102A connects through link 104A to communications network 106. Processor system 102B connects through link 104B to communications network 106. Further, processor system 102Z connects through link 104Z to communications network 106. Three dots 136 indicate that many processor systems may be connected to communications network 106. Also, memory system 108 connects through link 110 to directory 112, and directory 112 connects through link 114 to communications network 106. Also input output nodes (not shown) may be attached to communications network 106, and may be organized to provide direct memory access for transfers of data with memory 108.

The architecture of processor system 102A, and also the other processor systems of multi-processor computer system 100, is next described. Processor system 102A comprises: Processor 120A; cache memory 122A for processor 120A; Miss Address File (MAF) 124A, where the MAF holds a list of attempted accesses to cache 122A which missed, and which entries are retired upon successful completion of an access to memory which fulfills the attempted cache action; probe queue 126A which maintains a list of outstanding probes, and whose entries are retired upon completion of a probe action; and, Lock Address Register (LAR) 128A. Lock Address Register 128A comprises two fields, address field 129A and Lock Flag field 130A.

The architecture of processor system 102B is similar to that of processor system 102A, and is similar to the architecture of all of the processor systems through 102Z, etc. Three dots 136 indicate that a large number of processor systems 102A, 102B, . . . , 102Z, etc. may be employed in multiprocessor computer system 100. For example, there may be as many as 32 or alternatively 64, or alternatively 128, or alternatively 256, etc. multi-processor systems all communicating through communications network 106.

Memory 108 is accessible by all of the processors 102A through 102Z, etc. Directory 112 maintains records for operation of memory 108 in a multiprocessor environment.

Communications network 106 is illustrated in FIG. 1 as a simple straight line, which could be a simple bus. Alternatively, communications network 106 may be a routed network with router function maintained in processor systems 102A . . . 102Z. Further, communications network 106 may be implemented as a fast switch, such as crossbar switch. Further, computer network 106 may be implemented as a hierarchy of fast switches, where a lower level switch interconnects a specified number of processor systems, for example four processor systems, and a higher level switch interconnects a plurality of lower level switches, etc.

Further, memory 108 may be a single memory structure maintained in multiprocessor computer system 100, or memory 108 may be broken into smaller components, where each component is associated with a particular processor system 102A, . . . , 102Z, etc. Memory 108 is illustrated in FIG. 1 as a single memory structure to illustrate the point that all of the processors of processor system 102A, . . . , 102Z, etc. may read and write to all memory blocks in memory 108.

Communications network 106 provides a data pathway by which processors such as processors 120A of processor system 102A, processor 120B of processor system 102B, processor 120Z of processor system 102Z, . . . etc. may communicate with memory 108, and may communicate with each other by use of appropriate system command messages.

Figure 2A:
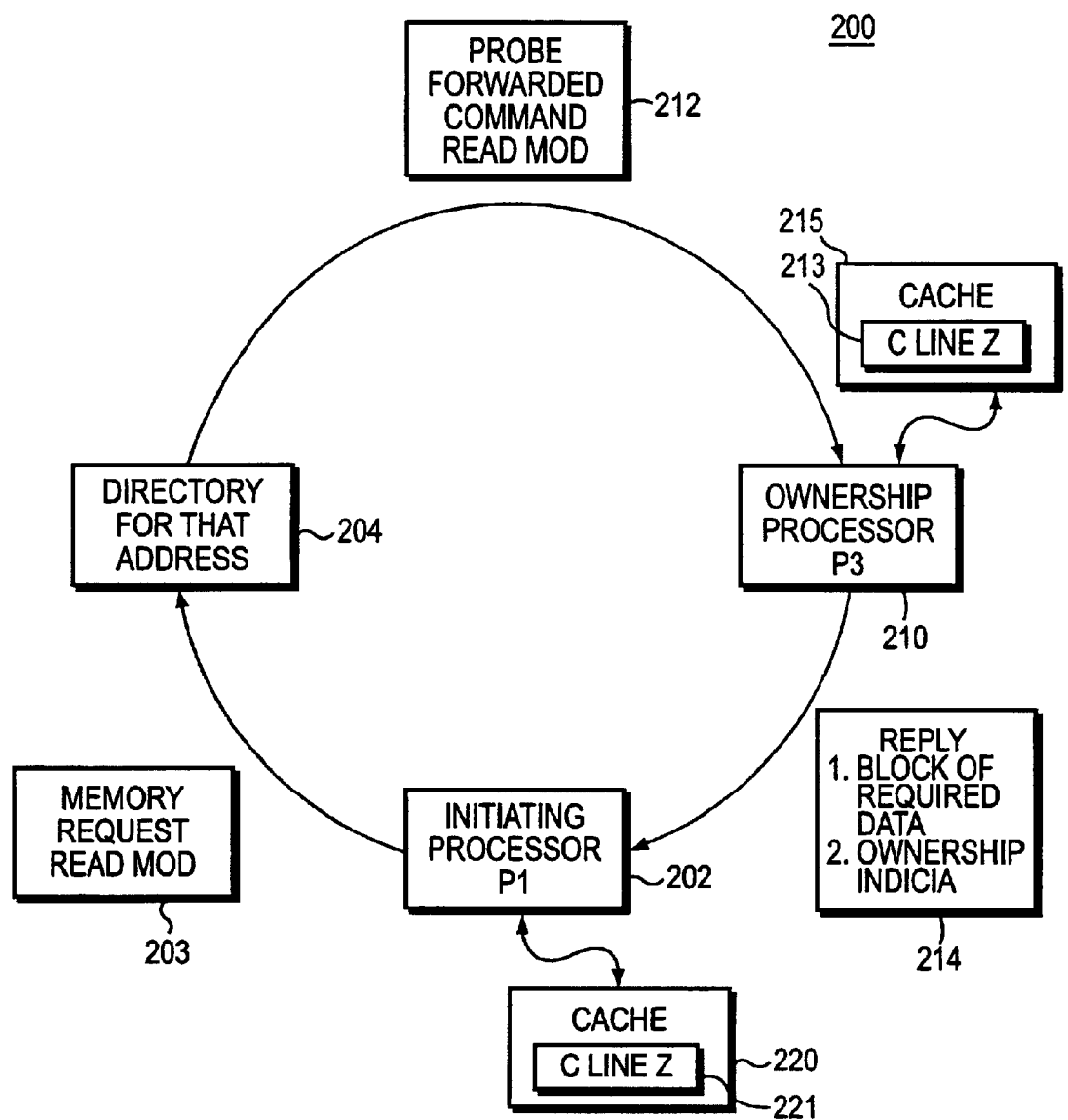
FIG. 2A is a transaction diagram of execution of a load locked instruction.

Turning now to FIG. 2A, a transaction diagram 200 showing a system executing a LOAD LOCKED instruction (LD_L) is shown. Initiating processor P1 202 executes a LD_L instruction in its assembly language instruction stream. In response to the LD_L instruction initiating processor P1 202 attempts to read the addressed memory location block Z 116 from its cache. Frequently, the desired data is not in the cache, and a cache miss occurs. After a cache miss the processors proceed to resolve the cache miss in accordance with the cache coherency system implemented in the multiprocessor computer system 100. An exemplary cache coherency system is described in the following description of the LD_L and ST_C instruction sequence.

Upon execution of the load locked, LD_L, assembly language instruction, processor 120A writes into Lock Address Register (LAR) 128A, at address field 129A the address of the desired memory location block Z 116 in memory 108, and sets Lock Flag LF 130A. Lock flag LF is set so that when the subsequent store conditional, ST_C, executes it can test lock flag 130A in order to succeed if the transaction is atomic, and to fail if it is not atomic.

The architecture of the various processors are the same, and the architecture will be referred to by use of the reference numerals for processor system 102A. Also, each processor has access to the directory 112.

In response to the cache miss, initiating processor P1 202 inquires of directory 112 as to the identity of the processor having ownership of memory block Z, and therefore holding in its cache the dirty copy of the desired cache line for memory block Z 116.

As a matter of terminology, the ownership processor of a memory block holds the dirty copy of the block in its cache. Other processors may hold copies of the dirty copy, and these copies are referred to as "valid" copies of the data of the memory block. Only the ownership processor can write to a memory block, or equivalently, can write to a cache line holding the value of a memory block. Accordingly, the ownership processor of the memory block writes to the dirty copy of the cache line holding data from the memory block. No processor other than the owner processor can write to the memory block, or to a cache line holding data from the memory block.

The inquiry by initiating processor P1 202 is made by P1 sending a RdMod memory request message 203 to directory 112. Directory 112 may be subdivided into parts, where different parts of directory 112 refer to particular address ranges in memory 108. Memory request message 203 is sent to that part 204 of directory 112 which has an entry for the address of memory block Z.

Figure 2B:
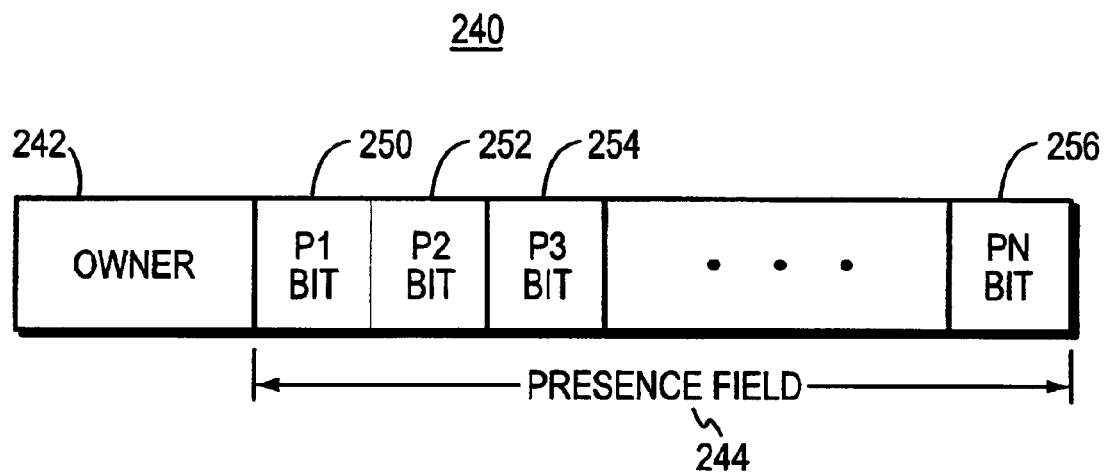
FIG. 2B is a field diagram of a directory entry for a memory block address.

Referring now to FIG. 2B, a directory entry 240 for a memory block is shown. For example, entry 240 may represent the directory entry for memory block Z 116. Owner field 242 contains the identification of the owner of memory block Z 116, where the owner may be a processor or may be memory. The cache of the owner processor contains the dirty copy of the data of the memory block. Presence field 244 has a presence bit for each processor. Presence Bit 250 refers to processor P1 120A. Presence Bit 252 refers to processor P2 120B. Presence Bit 254 refers to processor P3 (not shown in FIG. 1), and finally Presence Bit 256 refers to processor 120Z, etc. When a presence bit 250, 252, . . . 256 is set (bit equal 1), there is a valid copy of the memory block in the associated processor cache. A clear bit (bit equal 0) indicates that the associated processor cache does not have a valid copy of the memory block in its cache.

Returning now to consideration of FIG. 2A, the memory request 203 is a read modify (RD_MOD) system command. The RD_MOD system command both is a read request for the data in the desired cache line, and is a request to modify ownership of the desired cache line for memory block Z 116, by transferring ownership of the desired cache line to initiating processor P1 202.

The RD_MOD system command 203 is transferred on communications network 106 to the directory part 204 for the address of memory block Z 116. The directory determines the ownership processor by reading field 242 of directory entry 240. For example, field 242 indicates that processor P3 210 has ownership of memory block 116. Directory part 204 sends a Probe Forwarded ReadMod command 212 over communications system 106 to ownership processor P3 210. The directory then transfers ownership in directory entry 240 to initiating processor P1 202 by doing the following: first, writing the address of initiating processor P1 202 into owner field 242; and second, sending Inval Probes to each of the processors having a "set" presence bit 250, 252, . . . 256 in order to invalidate their cache copy of memory block Z 116. Further, all of the presence bits in directory entry 240 for memory block Z 116 are cleared to have the value "0", except for initiating processor P1 202 whose presence bit is set to a value of "1", to indicate that this new ownership processor has the new dirty copy of memory block Z 116 in its cache and all other copies are now invalid.

Ownership processor P3 210 receives Probe Forwarded ReadMod command 212. Ownership processor P3 210 reads its dirty copy 213 of memory block 116 from its cache 215, and places the data read from dirty cache line 213 into a Reply Message to be sent to initiating processor P1 202. Reply message 214 contains the block of required data read from formerly dirty cache line 213, and also an indicia of ownership so that initiating processor P1 202 will know that it is now owner of memory block Z 116 when it receives Reply Message 214.

Initiating processor P1 202 then receives Reply Message 214. Reply message 214 is also referred to as the Fil Message for the LD_L instruction. In response to Reply Message 214, initiating processor P1 202 recognizes that it is now the owner of memory block Z 116. Normally initiating processor P1 202 writes the block of required data read from Reply Message 214 into a register (not shown) of P1 202. Then P1 202 writes a new value of memory block Z 116 into its cache at cache line 221. Cache line 221 is now the new dirty copy of memory block Z 116. At some point in time the new dirty copy of cache line 221 may be written into memory 108 at memory block 116, depending upon the writeback policy employed by multiprocessor computer system 100.

As mentioned above, upon execution of the load locked, LD_L, assembly language instruction, processor 120A writes into Lock Address Register (LAR) 128A, at address field 129A the address of the desired memory location block Z 116 in memory 108, and sets Lock Flag LF 130A. Lock flag LF is set so that when the subsequent store conditional, ST_C, executes it can test lock flag 130A in order to succeed if the transaction is atomic, and to fail if it is not atomic.

Upon completion of the LD_L assembly language instruction, the RD_MOD system command completes, leaving processor P1 202 as owner of the desired memory block, and processor P1 cache having the dirty copy of the desired memory block.

In the event that after processor P1 202 completes its LD_L instruction, another processor, for example intervening processor Py, executes a write to the same desired memory block Z 116 in memory 108, then the intervening processor Py must first gain ownership of memory block Z 116. The directory transfers ownership, and also sends Inval Probes to all processors holding valid copies of a cache line holding memory block Z 116, in order to invalidate the cache entries. In response to receipt of the Inval Probe, owner processor P1 202 resets its Lock Flag 130A. Also owner processor P1 202 resets its Lock Flag 130A in the event that it receives a Forwarded RdMod Probe, such as Probe 212.

Execution of the STORE CONDITIONAL, ST_C, instruction is next described. The ST_C assembly language instruction causes processor 120A to first check its Lock Flag 130A. Lock Flag 130A is either "set", indicating that no intervening write to the desired memory location block Z 116 has occurred, or alternatively, Lock Flag 130A is "reset" indicating that an intervening write has occurred. Accordingly, in the event that the lock flag 130A is reset, then the ST_C instruction fails and returns a failure code to the assembly language program.

Figure 3:
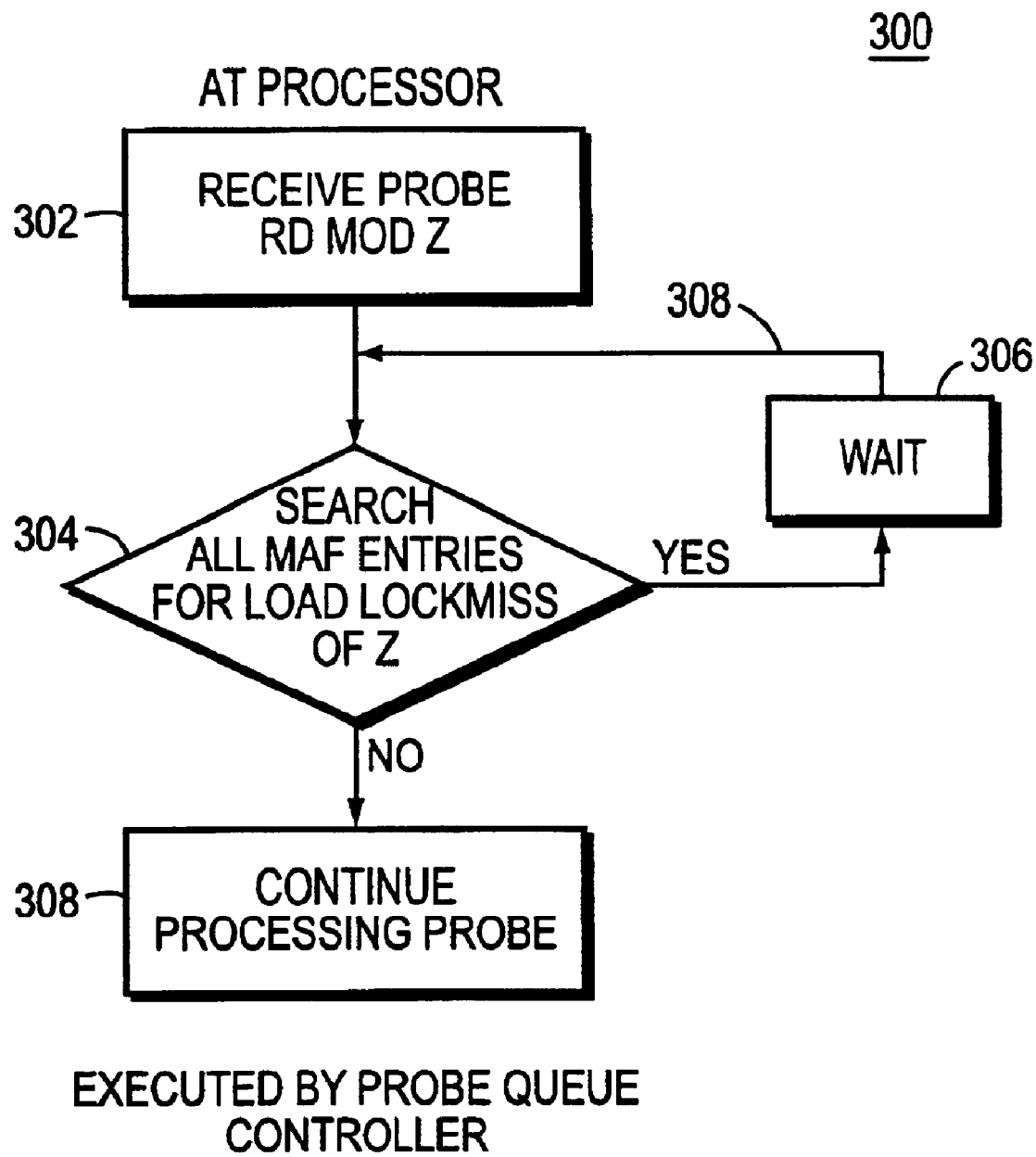
FIG. 3 is a flow diagram for a process executed by a probe queue controller.

Turning now to FIG. 3, a flow diagram for a process 300 by a processor responding to a Read Modify command in a Probe is shown. At block 302 the processor having the valid, or "dirty", copy of memory block Z 116 in its cache line 221 is shown receiving the RD_MOD Probe. After receiving the Read Modify Probe at bock 302, the process goes from block 302 to block 304.

At block 304 the process searches all entries in its Miss Address File (MAF) 124A. The process searches its MAF entries for a load locked miss for memory block Z 116.

Figure 4:
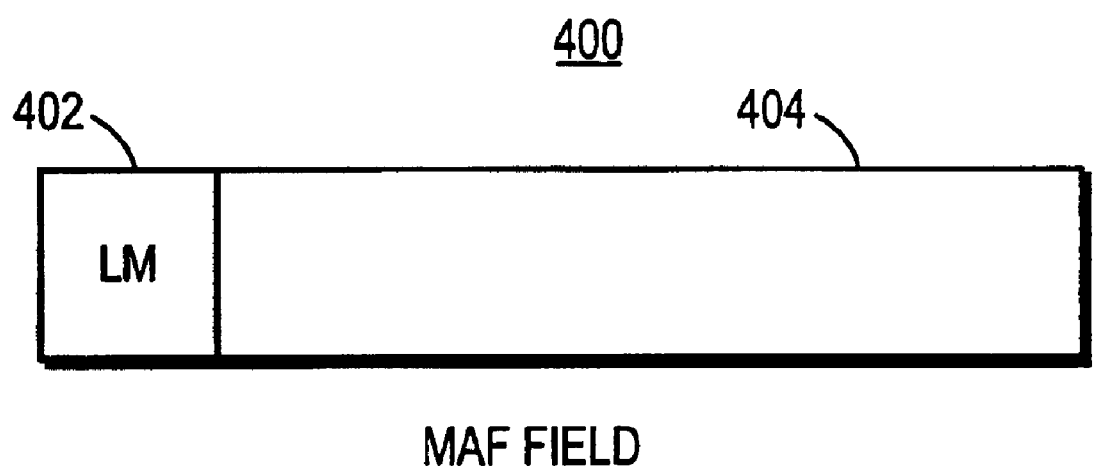
FIG. 4 a field diagram of a miss address entry in a MAF file.

Turning now to FIG. 4, a typical entry in the Miss Address File, MAF, 124A is shown. The MAF file contains an entry for each cache miss, and the entries persist until the cache miss is resolved. The MAF field 400 contains a field 402 that indicates whether or not the entry is for a Load Locked instruction which generated a cache miss, referred to hereafter as a Load Locked Miss. The Load Locked Miss field, LM field, 402 contains a bit which, in this exemplary embodiment, is "1" in the event that the MAF entry is for a Load Locked Miss. The LM bit 402 is "0" if the MAF entry is for some action other than a Load Locked Miss. Field 404 contains other data of the MAF entry.

Returning now to FIG. 3, at block 304 all MAF entries are searched for an entry representing a Load Locked Miss of memory element Z 116. In the event that such a MAF entry is found, the process branches to wait block 306. At wait block 306 the process waits for at least one rule of three rules to fire. The process 300 waits for a predetermined time period and then returns along path 308 to block 304 to test again for a MAF entry for a Load Locked instruction for memory block Z 116.

At block 304 the search for a MAF entry for a Load Locked Miss is again performed. In the event that a MAF entry is found at block 304, process 300 again goes to block 306 to again wait for the predetermined time period. In the alternative event that no MAF entry for a load locked miss of memory block Z 116 is found, the process goes to block 308.

At block 308 the process continues processing the probe.

In an exemplary embodiment of the invention, process 300 is executed by the probe queue controller, a controller associated with probe queue 126 A.

Figure 5:
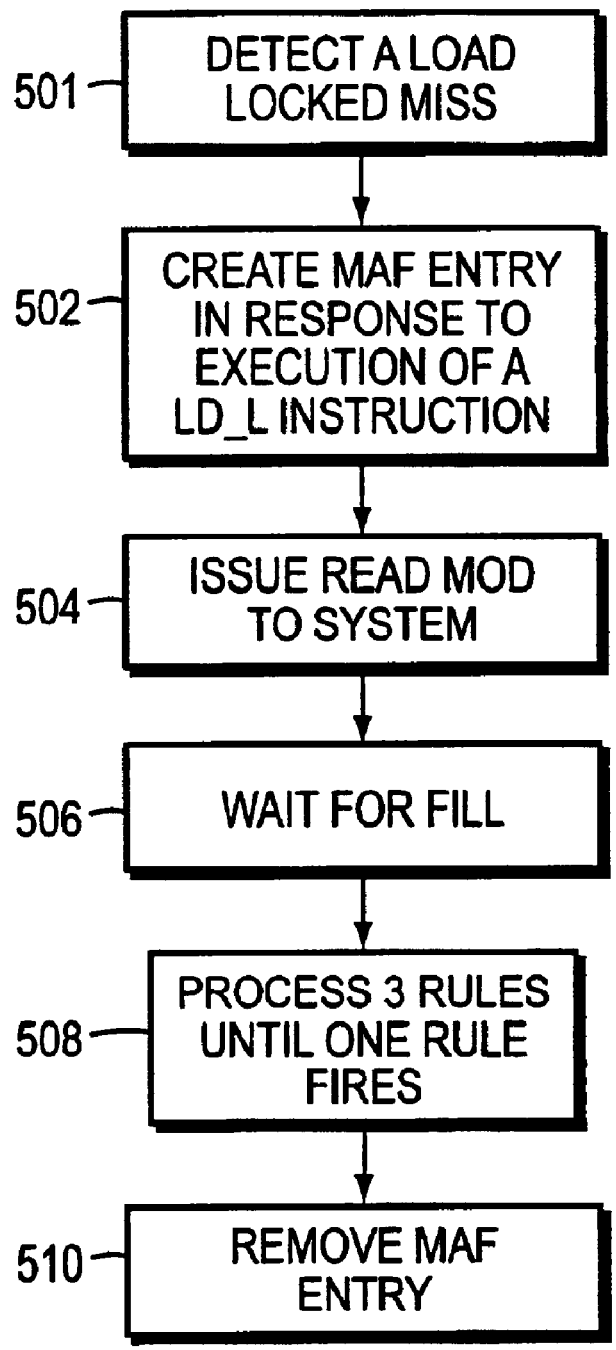
FIG. 5 is a block diagram of actions of a MAF state machine.

Turning now to FIG. 5, a MAF controller state machine 500 is shown. As noted above, an entry in MAF 124A is created whenever a cache miss occurs. The MAF file 124A entry is maintained until the cache miss is resolved. Accordingly, the MAF file is a log of all outstanding cache miss requests. State machine 500 is concerned only when a Load Locked Miss occurs.

At block 501 the occurrence of a Load Locked Miss is detected. Process 500 goes from block 501 to block 502. At block 502 an entry in MAF file 124A is created in response to execution of a Load Locked Miss. After creation of the MAF entry at block 502, the state machine goes to block 504.

At block 504, the state machine 500 issues a Read Modify system command, for example RD_MOD system command 203A. Upon issuance of the Read Modify system command, the state machine goes to block 506.

At block 506 the MAF controller state machine 500 waits for the Fill message. For example, Reply Message 214 is the Fil message with regard to the transaction shown in FIG. 2A. After the Fil message is received state machine 500 goes to block 508.

At block 508 the MAF controller state machine 500 processes the three rules in block 508 until one of the rules fires. After the Fill is received, and after one of the rules fires, state machine 500 goes to block 510.

At block 510 the MAF controller state machine 500 removes the MAF entry.

Upon removal of the MAF entry, and upon execution of the waiting period 306, the probe queue controller process 300 searches again at block 304 for a MAF entry for the Load Locked Miss of memory block Z 116. In the event that block 510 in the MAF controller state machine 500 has removed the MAF entry for the Load Locked Miss of memory block Z 116, block 304 branches on the "NO" branch to block 308 and continues processing the probe. The three rules processed in block 508 are:

1.) The processor has executed more than some predetermined number of instructions since it executed a LD_L instruction;
2.) Some pre-determined number of cycles have expired since P1 executed its most recent LD_L instruction, with this rule logically ANDed with the requirement that all load locked miss MAF entries have retired from the processors MAF file 124A;
3.) A ST_C instruction has been successfully retired for memory block Z 116 since the processor executed its most recent LD_L instruction for that memory block.

In an exemplary embodiment of the invention, the process waits for 10 instructions to have executed at the initiating processor before the initiating processor surrenders ownership of the block in response to an ownership Request message received in a Probe.

In an exemplary embodiment of the invention, the initiating processor waits for 1,000 clock cycles to have retired at the initiating processor before the initiating processor surrenders ownership of the block. However, when counting cycles, both the number of cycles must have retired since executing the LD_L instruction, AND the MAF entries must have all retired in order to insure that the wait is long enough to avoid livelock.

Rule 3 requires that the processor wait until the ST_C instruction completes.

Rule 1 and Rule 2 have the processor wait a reasonable time period for the ST_C instruction to execute. However, in the event that for some reason the ST_C instruction never executes, then either Rule 1 or Rule 2 will fire, and the process executing in the processor will go forward. A ST_C instruction may never execute for a number of reasons, for example: the program takes a branch which has no ST_C instruction written; a programming error; . . . etc.

In summary, operation of the loop between test block 304 and wait block 306, along with the rules exercised in block 508, prevents livelock by giving enough time after execution of the LD_L instruction for either the processor to advance a predetermined number of cycles, or for the processor to have retired a predetermined number of instructions, or for the ST_C instruction to have executed.

Persistence of the MAF entry for the LD_L instruction is extended by wait block 306 in a loop with block 304, until one of the three rules fires. This persistence of the MAF entry before the processor responds to a new ownership request provides enough latency to prevent livelock from developing by processors swapping ownership by each executing a LD_L instruction.

That is, ownership processor P1 202 will not surrender ownership to a probe for another processor executing a write after a Load Locked Miss until one of the three rules has expired. These rules hold ownership within initiating processor P1 202 for a sufficiently long time to prevent a livelock from developing as a result of the execution of the RD_MOD system command in response to the LD_L assembly language instruction by a plurality of processors contending for memory block 116.

Figure 6:
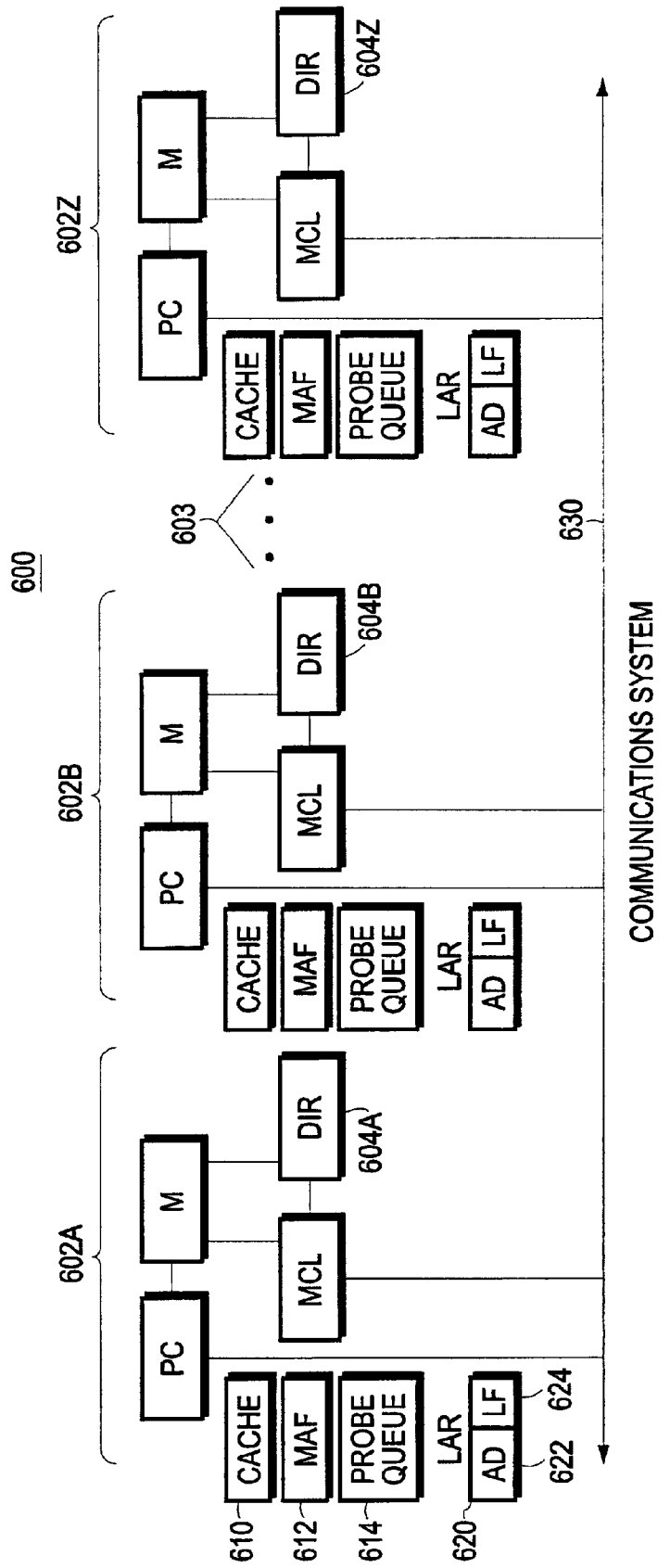
FIG. 6 is a block diagram of an alternative multiprocessor computer system.

Turning now to FIG. 6, a multiprocessor computer system 600 is shown, where the common memory 108 and the directory 112 are divided among "home" processors. For example, home processor 602A, home processor 602B, home processor 602Z, etc. each has "responsibility" for portions of memory 108. Directory 112 is also divided among the home processors, as shown by directory 604A, directory 604B, . . . , 604Z, etc. Three dots 603 indicate that multiprocessor computer system 600 may have a large number of home processor systems.

Having a portion of the memory and a portion of the directory associated with a processor such as processor system 602A provides a means for distributing memory near particular processors, and breaking up the directory into convenient subdivisions. Each of the processors also has a cache 610, a MAF 612, a Probe Queue 614, and a Lock Register with address field 622, and a Lock Flag 624, etc. Communications network 630 provides a path for messaging between the components of the multiprocessor computer system. Also input output nodes (I/O nodes) may be attached to communications network 630, and may be arranged to provide direct access transfers of data with memory blocks. Each processor system 602A, 602B, 602Z, etc. has a memory component M, and has an associated Memory Control Logic (MCL), and has a Distributed Directory (DIR).

With a distributed memory and directory system as shown in multiprocessor computer system 600 the execution of a LD_L and ST_C instruction sequence occurs through the processes shown in transaction diagram 200, etc.

Pseudo Code

Exemplary Pseudo Code for practice of the invention, where the pseudo code executes as an assembly language program in the initiating processor, follows.

PointA: LD_L (block Z)
   BNE to PointA
      —other instructions may intervene here—
   ST_C(block Z)
   BNE to PointA LD_L is the load lock instruction. The processor, in response to the LD_L instruction issues a READ MOD system command, as described with reference to FIGS. 2A, 2B, 3, and 4, etc. The READ MOD returns the memory block Z and ownership of memory block Z.

The BNE following the LD_L is a branch instruction which branches on the return value from the LD_L instruction, and branches to PointA in the event that the LD_L returns "lock is busy" indication, indicating that some intervening processor now has acquired the lock. The branch to PointA puts the code in a loop so that it repeats the LD_L until the lock is free to be acquired.

ST_C is the store conditional instruction. The ST_C tests the lock flag and writes to block Z in its cache if the flag is still set. If the flag is clear the ST_C does not do the write (an intervening processor has gained ownership). The ST_C returns a "0" if it did the write (successful) and a "1" if it did not do the write (fails).

The BNE following the ST_C branches in response to a value returned by the ST_C. If the ST_C fails, it returns a failure code "1", and the BNE branches to PointA in order for the processor to enter a loop to again try to gain an atomic read write. In the event that the ST_C succeeds and returns a "0", the code passes to the next instruction (not shown).

Avoiding Livelock

Livelock is described as follows. Livelock is a situation where two or more processors contend for ownership of a memory block, and where they trade ownership among themselves without making further progress in executing their code. If a LD_L (block Z) instruction is defined to have the processor issue both system Read command and a system ownership request command for block Z, then livelock can develop. A first processor executes its LD_L instruction and obtains ownership of block Z. Then, before the ST_C completes for the first processor, a second processor executes a LD_L for memory block Z and so takes ownership away from the first processor. The first processor then goes into the loop illustrated in the pseudo code above, again executes its LD_L instruction before the second processor can execute its ST_C, and so steals ownership of the block from the second processor. Again, the second processor steals ownership from the first processor, and so on ad infinitum.

The invention avoids livelock by requiring the waiting period shown in block 306 of FIG. 3, and at block 506 of FIG. 5. A processor which has issued a RD_MOD system command in response to a LD_L instruction waits for one of the three rules to fire before it surrenders ownership of the memory block to subsequent ownership Request messages. The wait illustrated in the block 306 loop continues until one of the three rules illustrated in block 508 fires. Waiting for one of these rules to fire before the initiating processor surrenders ownership of the memory block following its execution of a LD_L instruction is sufficient to prevent livelock. Rule 3 waits for the ST_C to execute. Rules 1 and 2 wait for a predetermined number of cycles or instructions to have retired in the processor, as a wait for a reasonable time for the ST_C to execute, in case the processor never executes a ST_C.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method for executing a load locked and a store conditional instruction in a processor, comprising:

executing the load locked instruction to read a memory block, and said processor in response to executing the load locked instruction issuing a read modify system command to read said block and to take ownership of said block by said processor, and also setting a lock flag for the address of said memory block, and writing a value of said memory block into a cache of said processor as a cache copy of said memory block;

resetting said lock flag upon receipt of an invalidate message for said cache copy of said memory block, if any said invalidate messages are received by said processor;

waiting for a selected time interval before said processor surrenders ownership of said memory block upon receipt of an ownership request message, if any is received by said processor after execution of said load locked instruction;

executing the store conditional instruction, and said processor in response to executing said store conditional instruction testing said lock flag, and if said lock flag is set, writing to said cache copy of said memory block.

2. The method as in claim 1 further comprising:
   checking the cache before executing the load locked instruction, and in the event that there is a cache miss, then proceeding to execute said load locked instruction, and in the event that there is a cache hit then reading the value from its cache and setting said lock flag.

3. The method as in claim 1 further comprising:
   said invalidate messages are Inval Probes.

4. The method as in claim 1 further comprising:
   said invalidate messages are forwarded RdMod probes.

5. The method as in claim 1 wherein said executing said store conditional instruction further comprises:
   ending, in the event that said lock flag is reset, said store conditional instruction and not writing to said cache copy of said memory block.

6. The method as in claim 1 wherein said selected time interval further comprises:
   a first time required for a predetermined number of cycles of a clock in said processor to retire.

7. The method as in claim 1 wherein said selected time interval further comprises:
   a second time required for a predetermined number of assembly language instructions executing in said processor to retire.

8. The method as in claim 1 wherein said selected time interval further comprises:
   a third time required until a store conditional instruction referring to said memory block executes.

9. The method as in claim 1 wherein said selected time interval further comprises:
a fourth time for all MAF entries in said processor MAF file to retire.

10. The method as in claim 1 wherein said selected time interval further comprises:
a fifth time during which a MAF entry for the LD_L instruction persists in a MAF file of said processor.

11. A computer executing a load locked and store conditional instructions, comprising:
a processor executing the load locked instruction to read a memory block, and said processor in response to executing the load locked instruction issuing a read modify system command to read said block and to take ownership of said block by said processor, and also setting a lock flag for the address of said memory block, and writing a value of said memory block into a cache of said processor as a cache copy of said memory block;
a MAF state machine resetting said lock flag upon receipt of an invalidate message for said cache copy of said memory block, if any said invalidate messages are received by said processor;
a controller waiting for a selected time interval before said processor surrenders ownership of said memory block upon receipt of an ownership request message, if any is received by said processor after execution of said load locked instruction;
said processor executing the store conditional instruction, and said processor testing said lock flag, and if said lock flag is set, writing to said cache copy of said memory block.

12. The apparatus as in claim 11 further comprising:
said processor checking the cache before executing the load locked instruction, and in the event that there is a cache miss then proceeding to execute said load locked instruction, and in the event that there is a cache hit then reading the value from its cache and setting said lock flag.

13. The apparatus as in claim 11 further comprising: said invalidate message is an Inval Probe.

14. The apparatus as in claim 11 further comprising: said invalidate message is a RdMod probe.

15. The apparatus as in claim 11 further comprising:
said processor ending, in the event that said lock flag is reset, said store conditional instruction and not writing to said cache copy of said memory block.

16. The apparatus as in claim 11 further comprising:
a first time required for a predetermined number of cycles of a clock in said processor to retire.

17. The apparatus as in claim 11 further comprising:
a second time required for a predetermined number of assembly language instructions executing in said processor to retire.

18. The apparatus as in claim 11 further comprising:
a third time required until a store conditional instruction referring to said memory block executes.

19. The apparatus as in claim 11 further comprising:
a fourth time for all MAF entries in said processor MAF file to retire.

20. The apparatus as in claim 11 further comprising:
a fifth time during which a MAF entry for the LD_L instruction persists in a MAF file of said processor.

21. A method of operating a multiprocessor computer system, comprising:
executing a load locked and a store conditional instruction in each processor in accordance with the following steps;
executing said load locked instruction to read a memory block, and said processor in response to executing the load locked instruction issuing a read modify system command to read said block and to take ownership of said block by said processor, and also setting a lock flag for the address of said memory block, and writing a value of said memory block into a cache of said processor as a cache copy of said memory block;
resetting said lock flag upon receipt of an invalidate message for said cache copy of said memory block, if any said invalidate messages are received by said processor;
waiting for a selected time interval before said processor surrenders ownership of said memory block upon receipt of an ownership request message, if any is received by said processor after execution of said load locked instruction;
executing the store conditional instruction, and said processor in response to executing said store conditional instruction testing said lock flag, and if said lock flag is set, writing to said cache copy of said memory block.

22. A multiprocessor computer system comprising:
a plurality of processor systems, each processor system having a processor executing a load locked and store conditional instructions,
said processor executing the load locked instruction to read a memory block, and said processor in response to executing the load locked instruction issuing a read modify system command to read said block and to take ownership of said block by said processor, and also setting a lock flag for the address of said memory block, and writing a value of said memory block into a cache of said processor as a cache copy of said memory block;
a MAF state machine resetting said lock flag upon receipt of an invalidate message for said cache copy of said memory block, if any said invalidate messages are received by said processor;
a controller waiting for a selected time interval before said processor surrenders ownership of said memory block upon receipt of an ownership request message, if any is received by said processor after execution of said load locked instruction;
said processor executing the store conditional instruction, and said processor testing said lock flag, and if said lock flag is set, writing to said cache copy of said memory block.

23. A computer readable media comprising: computer readable instructions for the practice of the method of claim 1 written thereon.

24. Electromagnetic signals propagating on a computer network, said electromagnetic signals carrying information for the practice of the method of claim 1.

* * * * *